United States Patent [19]

Kotlar et al.

[11] Patent Number: 6,028,146
[45] Date of Patent: Feb. 22, 2000

[54] FREE RADICAL GRAFTING OF MONOMERS ONTO POLYPROPYLENE RESINS

[75] Inventors: Hans K. Kotlar, Skien, Norway; Guo H. Hu; Yi J. Sun, both of Strasbourg, France; Morand Lambla, deceased, late of Strasbourg, France, by Francine Lambla, Florence C Lambla, and Pierre M Lambla, legal representatives

[73] Assignee: Borealis A/S, Lyngby, Denmark

[21] Appl. No.: 08/793,420

[22] PCT Filed: Aug. 26, 1994

[86] PCT No.: PCT/NO94/00140

§ 371 Date: May 14, 1997

§ 102(e) Date: May 14, 1997

[87] PCT Pub. No.: WO96/06872

PCT Pub. Date: Mar. 7, 1996

[51] Int. Cl.[7] .................................................. C08F 255/02
[52] U.S. Cl. ........................... 525/242; 525/244; 525/263; 525/284; 525/286; 525/326.1
[58] Field of Search ..................... 525/242, 244, 525/263, 284, 286, 326.1

[56] References Cited

U.S. PATENT DOCUMENTS 5,079,295  1/1992  Furuta et al. ............................ 525/68

FOREIGN PATENT DOCUMENTS

| 0 280 454A2 | 8/1988 | European Pat. Off. . |
| 0 317 358 | 5/1989 | European Pat. Off. . |
| 0 356 194 | 2/1990 | European Pat. Off. . |
| 177059 | 4/1995 | Norway . |
| WO 94/13719 | 6/1994 | WIPO . |

OTHER PUBLICATIONS

Patent Abstracts of Japan, vol. 17, No. 647, C–1135, "Modified Propylene Polymer Composition, Molding Material Containing the Same, and Film or Sheet Made Therefrom", 5–209025 (Dainippon Ink & Chem Inc.), Aug. 20, 1993.

Patent Abstracts of Japan, vol. 12, No. 391, C–537, A, 63–137910, "Weather–Resistant Resin Having Excellent Rib Strength", (Sumitomo Naugatuck Co., Ltd.), Jun. 9, 1988.

*Primary Examiner*—Nathan M. Nutter
*Attorney, Agent, or Firm*—Kirkpatrick & Lockhart LLP

[57] ABSTRACT

A method of free radical grafting of monomers onto a polypropylene resin includes: (i) mixing the polypropylene resin with an allylepoxy compound, a styrenic compound and a peroxide as an initiator, (ii) heating the mixture to a temperature which is higher than the melting point of the polypropylene resin and the decomposition temperature of the peroxide, at conditions of continuous mixing until a desired degree of grafting of the allylepoxy compound and the styrenic compound onto the polypropylene resin has been achieved, and (iii) cooling and comminuting the obtained composition. A grafted polypropylene composition provided by the method includes an amount of glycidyl methacrylate of 0 to 10% by weight and an amount of styrene of 0 to 10% by weight, calculated on the polypropylene resin. The composition may be used as a compatibilizer in the manufacturing of polymer blends, as a polymer adhesion promoter, and in articles which require an improved printability.

15 Claims, No Drawings

FREE RADICAL GRAFTING OF MONOMERS ONTO POLYPROPYLENE RESINS

This application claims the benefit under 35 USC 371 of prior PCT International Application No. PCT/NO 94/00140 which has an International filing date of Aug. 26, 1994.

TECHNICAL FIELD.

This invention relates to a method of free radical grafting of monomers onto polypropylene resins. More particular the invention relates to a method of the simultaneous grafting of two different monomers, preferably an allylepoxy compound and a styrenic compound, onto a polypropylene polymer, and the material obtained in said method.

BACKGROUND ART

The modification of polypropylene resins by grafting specific compounds onto the polymer backbone chain in order to produce compositions having improved properties, is previously known.

EP 0,280,454 discloses a method for the grafting of at least two different monomers onto molten hydrocarbon polymer. In working examples the polymer is a homopolymer of propylene, a high density polyethylene or linear low density polyethylene, and the monomers are styrene or maleic anhydride. Contrary to the present method, the process is operated in the absence of an initiator for the grafting reaction and in the substantial absence of antioxidant in the polymer, by the use of an extruder at extrusion conditions.

U.S. Pat. No. 5,079,295 relates to a thermoplastic composition comprising a polyphenylene ether resin, a modified propylene polymer and a rubbery substance. The polypropylene component is grafted with a styrene-based monomer and an unsaturated carboxylic acid or its derivative. A number of grafting processes are described. In the working examples 100 parts by weight of polypropylene are mixed with one part of maleic anhydride (MAH), one part of styrene and one part of peroxide in a mixer, and subsequently extruded at 220° C. In another embodiment in an autoclave a dispersion of polypropylene, styrene and MAH in water is allowed to react at 120° C. In further embodiments the MAH of said dispersion is replaced by glycidyl methacrylate or glycidyl acrylate.

U.S. patent application Ser. No. 924,786 relates to polypropylene compositions grafted with glycidyl acrylate or glycidyl methacrylate (GMA) using an organic peroxide as a radical-generating agent, performed by kneading the melted mixture, preferably in an inert atmosphere.

In a grafting process, the high molecular weight of the virgin polypropylene resin should be maintained to retain its desired physical and mechanical properties. If only one type of monomer, such as a monomeric allylepoxy compound, is used in a polypropylene grafting method, the achieved grafting efficiency is poor and accompanied by a heavy degradation of the polymer by chain scission in the β-position and simultaneous homopolymerization of the added monomer. Such a degradation of the polypropylene will inevitably result in polypropylene compositions having a reduced molecular weight, and consequently articles manufactured therefrom will have mechanical properties inferior to those of articles made from virgin polypropylene resins. The problem of chain scission would be avoided if the grafting could be performed in the presence of a compound having a stabilizing effect on the intermediate polymeric radicals created during the grafting process. The composition would then maintain its high molecular weight and its highly valued physical properties.

SUMMARY OF THE INVENTION

It has now surprisingly been found that the degradation of the polypropylene polymer by β-scission during a free radical initiated grafting of monomers onto the polypropylene polymer chains can be strongly limited when said grafting is performed in the presence of a styrenic compound. Thus, a polypropylene resin in a molten state may be grafted with a monomeric allylepoxy compound in the presence of a styrenic compound without any noticeable degradation of the polypropylene polymer itself.

The present invention thus provides a method of free radical grafting of monomers onto a polypropylene resin having a melt flow index of 0.2 to 100 g/10 minutes, preferably 0.2 to 50 g/10 minutes (measured according to ASTM D 1238 at 230° C./2.16 kg), comprising the steps of:

(i) mixing the polypropylene resin with an allylepoxy compound having the formula:

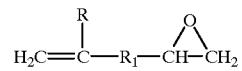

in which R is H or a $C_{1-4}$ alkyl; and $R_1$ is —$(CH_2)_n$—; —C(O)O—$(CH_2)_n$—; or —$(CH_2)_n$—O—; and n is an integer of 1 to 4;
a styrenic compound having the formula:

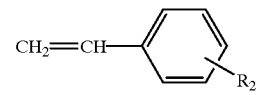

in which $R_2$ is H, OH, $CH_3$ or allyl; and
a peroxide as an initiator, (ii) heating said mixture to a temperature which is higher than the melting point of the polypropylene resin and the decomposition temperature of said peroxide at conditions of continuous mixing until a desired degree of grafting of the allylepoxy compound and the styrenic compound onto the polypropylene resin has been achieved, and (iii) cooling and comminuting the obtained composition.

The invention also provides a grafted polypropylene composition being obtained by the method described above.

The composition of the present invention, may be used as a compatibilizer in the manufacturing of a polymer blend, as a polymer adhesion promotor, and in articles which require an improved printability.

DETAILED DESCRIPTION OF THE INVENTION

It is an object of the present invention to achieve a method of free radical grafting of monomers onto a polypropylene resin, which method being performed at conditions resulting in an improved level of grafting without any substantial degree of polypropylene degradation by chain scission. This is accomplished when the grafting of an allylepoxy compound is performed in the presence of a styrenic compound.

The polypropylene resins that may be used in the grafting method of the present invention, comprise polypropylene homopolymers and copolymers of propylene with ethylene and/or butadiene, in particular resins having a weight average molecular weight of 150,000 to 500,000 and a melt flow index of 0.2 to 100 g/10 minutes, preferably 0.2 to 50 g/10 minutes, determined at 230° C and 2.16 kg load according to the method of ASTM D 1238. Copolymers may contain up to 20% by weight, preferably 2 to 12% by weight, of ethylene.

The monomeric allylepoxy compound to be grafted onto the polymer chains mast contain polar or functional substituents. Said monomers are preferably chosen from the group comprising allylepoxy compounds having the formula:

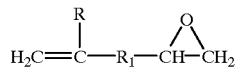

in which R is H or a $C_{1-4}$ alkyl; and $R_1$ is —$(CH_2)_n$—; —$C(O)O$—$(CH_2)_n$—; or —$(CH_2)_n$—$O$—; and n is an integer of 1 to 4.

Preferably R is H or $CH_3$, and more preferably $CH_3$. $R_1$ is preferably —$C(O)O$—$(CH_2)_n$—. Thus the most preferred compound is glycidyl methacrylate.

Suitable styrenic compounds are those having the formula:

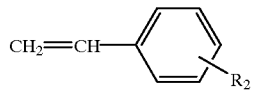

in which $R_2$ is H, OH, $CH_3$ or allyl. Preferably $R_2$ is H, making styrene the most preferred styrenic compound. The styrenic compound is assumed to stabilize by delocalization the free radical species being present during the grafting process. Other compounds than those mentioned above having conjugated unsaturated double bonds, e.g. quinone, may give similar results.

To initiate the grafting process any free radical generating peroxide compound known in the art having a suitable decomposition temperature, may be used. In particular the following peroxide initiators have been found to give acceptable results: 2,5-bis(tert-butylperoxy)-2,5-dimetylhexane ("DHBP"), bis(tert-butylperoxyisopropyl) benzene ("Perkadox-14") and 2,5-bis(tert-butylperoxy)-2,5-dimethyl-3-hexyne ("Trigonox-145").

Intimate mixing of the polypropylene resins, the initiator and the grafting monomers at a temperature higher than both the melting point of the polypropylene resin and the peroxide decomposition temperature is a prerequisite for achieveing a desired degree of grafting in the present method. The required grafting conditions can be accomplished both in a batch process and a continuous process.

In the batchwise grafting process any suitable, closed batch mixer of a conventional type equipped with a continuous stirring device can be used, for example a Haake mixer.

The polypropylene resin is introduced along with the styrenic compound, the allylepoxy compound and the initiator into the preheated mixer operated at a mixing speed of 10 to 200 rpm and at a temperature of 150 to 200° C. Normally an acceptable degree of grafting is accomplished within a time period of less than 15 minutes at said temperatures.

Preferably, the grafting is performed in a continuous manner, and an extruder may be used for the purpose. The grafting conditions are adapted to the type of extruder used, as will be well known to a man skilled in the art. The most important features of the process are to secure adequate mixing and a uniform temperature of the polymer melt, as well as a sufficient dwell time to ensure the completion of the grafting reactions. A double screw extruder having co-rotating intermeshing screws is preferably used, for example a ZSK Werner & Pfleiderer machine.

In both the batchwise and the continuous grafting method the components may be fed to the mixing machine in any practical way. The sequence of adding the components is not critical. In the continuous extrusion method the components may optionally be premixed, which may be done by the use of any conventional mixer and mixing method known in the art.

To obtain an optimal degree of grafting, 100 parts by weight of polypropylene resin is mixed with up to 10 parts by weight of the styrenic compound and up to 10 parts by weight of the allylepoxy compound. Obviously the actual weights of the styrenic and the allylepoxy compounds will depend on the specific types of compounds used, and the invention is not restricted to the use of specific amounts of the grafting compounds. The initiator is usually added in an amount of up to 0.25% by weight of the starting polypropylene resin, but higher amounts may also be used.

A problem connected with the grafting method is a possible contamination of the reagents with oxygen from the surrounding air. Oxygen will react spontaneously with the generated radicals, giving oxy-radicals which are particularly active agents in polymer chain scissions. Therefore, the grafting method is preferably carried out under an inert atmosphere, most preferably in an atmosphere of nitrogen.

The polymer chain scissions and the molecular weights of the present compositions can be controlled by the use of the comonomer system described herein. In the grafting reactions taking place the styrenic compound will function as a chain transfer agent. When the grafting is performed at the conditions of operation described herein, the degradation of the polypropylene backbone chain by β-scission will be significantly lower than what can be achieved in traditional grafting processes without the use of a chain transfer compound.

In an embodiment of the present invention as demonstrated by the working examples, at a given constant concentration of glycidyl methacrylate the grafting efficiency of glycidyl methacrylate increases when the styrene concentration increases, while the incorporation efficiency of styrene is substantially constant. When styrene monomer being present, the glycidyl methacrylate grafting level increases more than two times compared with the case of styrene not being present.

A composition obtained by the present method will comprise an amount of glycidyl methacrylate of 0 to 10% by weight, preferably 2 to 5% by weight, and an amount of styrene of 0 to 10% by weight, preferably 2 to 5% by weight, said weights being calculated on the basis of the starting, neat polypropylene resin.

The styrenic compound also acts as a comonomer, reacting with the allylepoxy monomers giving random copolymers. Thus, the side chains grafted onto the polypropylene backbone are random copolymers of said two species. The bulky benzene groups of said copolymers will exert a sterical effect making the reactive sites more accessible to the polymerizing monomers of the reaction mixture, and as a consequence a higher amount of glycidyl methacrylate can be copolymerized and grafted onto the polypropylene resin. The increased amount of incorporated glycidyl methacrylate increases the number of polar groups in the polypropylene composition, enhancing its compatibilizing effect. The styrenic compound has a combinatorial effect in that it is both participating as a comonomer in the copolymerization reactions and it is simultaneously acting as a chain transfer compound in said reactions. The polymeric composition obtained in the grafting method of the present invention will have a higher amount of allylepoxy compound and styrenic compound grafted onto the polymer chain than what is obtainable by any other known process, while the extent of polypropylene chain scissions is substantially reduced compared to other grafting processes.

The composition obtained in the method of the present invention is particularly suitable as a compatibilizing precursor in polymer blends of various types. Typical amounts to be used in such blends are within the range of 0.1 to 15% by weight, preferably 1 to 5% by weight, based on the weight of the final blend.

The grafted polypropylene composition of the present invention may also be used as a polymer adhesion promotor, in bonding layers, and being utilized in coating processes. Moreover, the increased polarity of the grafted polypropylene composition will improve the paintability of articles manufactured therefrom.

The invention will now be illustrated and described in more detail by ways of examples, which have not be construed as limiting the invention.

EXAMPLES

Batch Grafting Method

Polypropylene resin, styrenic monomer, glycidyl methacrylate (GMA) and peroxide, are introduced into a conventional closed Haake mixer equipped with a stirring device. The mixer is running at a constant speed of 64 rpm during the entire grafting process. Samples of hot, grafted polymer are withdraw n and cooled in air of ambient temperature or in liquid nitrogen.

Continuous Grafting Method

Polypropylene compositions are grafted continuously in a ZSK Werner & Pfleiderer double screw extruder with corotating intermeshing screws of length 1230 mm and L/D=42. The screw rotating speed is 150 rpm in all the presented examples. The polypropylene material premixed with styrenic, GMA and initiator, is fed to the extruder at a constant rate of 3.5 kg/h of polypropylene material. The present temperature profile in the extruder is:

| Barrel zones: | Feeding | Compression | Mixing | Metering and die |
| --- | --- | --- | --- | --- |
| Temperature (° C.) | 200 | 200 | 230 | 240 |

The polypropylene polymer is extruded as strands, cooled by water and then pelletized.

Analysis of Grafted Polypropylene Compositions

Collected samples of polypropylene compositions are dissolved in hot xylene, then precipitated by adding large amounts of acetone of ambient temperature to the hot solution. The precipitate is dried under vacuum at 50° C. for 8 hours. The amounts of grafted styrene and/or GMA onto the polypropylene resins are determined by IR spectrometry. The weight and number average molecular weights, $M_w$ and $M_n$, respectively, of each sampled polymer are measured by size exclusion chromatography (SEC).

Experimental data and achieved results are indicated in tables 1 to 4. The concentrations of styrene, glycidyl methacrylate and peroxide in the starting reaction mixture are denoted $[styrene]_i$, $[GMA]_i$, and $[peroxide]_i$, respectively, while the amounts of styrene and glycidyl methacrylate grafted onto the polypropylene resins are denoted $[styrene]_g$ and $[GMA]_g$, respectively. The grafting efficiency of GMA and styrene given in the tables indicate the amount of each compound grafted onto the polymer resin in percent of the total amount of said compound introduced into the starting reaction mixture. The presented molecular weight distribution, MWD, is calculated as: $MWD = M_w/M_n$.

In the following examples all quantities given in percent by weight are based on the weight of the ungrafted polypropylene polymer starting resin, unless otherwise stated.

Grafting Experiments in a Discontinuous Haake Mixer

Comparative Example A

Polypropylene resin in the form of powder is introduced into the mixer stirred at 64 rpm and heated to 200° C. After 15 minutes of reactive mixing at 200° C., hot samples are collected and cooled in air of ambient temperature. The measured molecular weight and the calculated molecular weight distribution are presented in Table 1.

Comparative Example B

Polypropylene powder premixed at ambient temperature with 0.22% by weight of "DHBP" peroxide, is introduced into the mixer. The mixing and sampling conditions are as in comparative example A. The obtained molecular weight and molecular weight distribution of the sample are presented in Table 1.

Comparative Examples C, D, E and F

Polypropylene powder premixed at ambient temperature with 0.22% by weight of "DHBP" peroxide and 0.58, 1.49, 4.44 and 7.48% by weight, respectively, of styrene, is introduced into the mixer. The mixing and sampling conditions are as in comparative example A. The amounts of grafted styrene of the polypropylene compositions are presented in Table 1.

Comparative Example G

Polypropylene powder premixed at ambient temperature with 0.24% by weight of "DHBP" peroxide and 5.84% by weight of GMA monomer, is introduced into the mixer. The mixing and sampling conditions are as in comparative example A. The obtained molecular weight, the molecular weight distribution and the amount of grafted GMA of the polypropylene composition are presented in Table 2 below.

Examples 1–4

Polypropylene powder premixed at ambient temperature with 0.24% by weight of "DHBP" peroxide, between 5.8 and 6.1% by weight of GMA, and 2.18, 3.50, 4.40 and 6.53% by weight respectively of monomeric styrene is introduced into the mixer. Hence, the ratio of $[styrene]_i$ to $[GMA]_i$ varies from 0.5 to 1.5 on a molar basis. The mixing and sampling conditions are as in comparative example G. The results obtained are presented in Table 2.

Comparative Example H

Polypropylene powder premixed at ambient temperature with 5.82% by weight of GMA and 8.73% by weight of styrene are introduced into the mixer. Mixing and sampling conditions are as in comparative example G. The obtained molecular weight, molecular weight distribution, amounts of grafted GMA and styrene of the polypropylene composition are presented in Table 3 below.

Examples 5–8

Polypropylene powder premixed at ambient temperature with 5.82% by weight of GMA, 8.73% by weight of styrenic and from 0 to 0.44% by weight of "Perkadox-14" peroxide is introduced into the mixer. Mixing and sampling conditions are as in comparative example H. The obtained molecular weights, molecular weight distributions, and amounts of grafted GMA and styrene of the obtained polypropylene compositions are presented in Table 3 below.

Continuous Grafting at Extrusion Conditions

Examples 9 and 10

Polypropylene powder premixed at ambient temperature with 0.30% by weight of "Perkadox-14" peroxide and with GMA and monomeric styrene in amounts as indicated in table 4 below, keeping a constant ratio of $[styrene]_i/[GMA]_i=1.40$ on a molar basis, is fed to the extruder. The extrusion conditions are as given above. Samples are collected at the extrusion die and the amounts of grafted GMA and styrene in the obtained compositions determined. The obtained results are presented in Table 4.

TABLE 1

| Example | $[Peroxide]_i$ % wt | $[Styrene]_i$ % wt | $[Styrene]_g$ % wt | Graft. eff. styrene % | $M_w$ g/mol | MWD |
|---|---|---|---|---|---|---|
| Comp. A | — | — | — | | 314,000 | 3.0 |
| Comp. B | 0.22 | — | — | | 137,000 | 2.6 |
| Comp. C | 0.22 | 0.58 | 0.20 | 34 | | |
| Comp. D | 0.22 | 1.49 | 0.49 | 33 | | |
| Comp. E | 0.22 | 4.44 | 1.43 | 32 | 283,000 | 3.1 |
| Comp. F | 0.22 | 7.48 | 2.10 | 28 | | |

TABLE 2

| Example | $[GMA]_i$ % wt | $[Styrene]_i$ % wt | $[GMA]_g$ % wt | $[Styrene]_g$ % wt | Graft eff. GMA % | Graft eff. Styrene % | $M_w$ g/mol | MWD |
|---|---|---|---|---|---|---|---|---|
| Comp. G | 5.84 | 0 | 0.50 | — | 8.6 | — | 229,000 | 2.9 |
| 1 | 5.96 | 2.18 | 0.97 | 0.29 | 16.4 | 13.3 | 256,000 | 2.9 |
| 2 | 5.82 | 3.50 | 1.24 | 0.50 | 21.3 | 14.3 | 239,000 | 3.7 |
| 3 | 5.82 | 4.40 | 1.31 | 0.62 | 22.5 | 14.1 | 327,000 | 3.3 |
| 4 | 6.06 | 6.53 | 1.52 | 0.95 | 25.1 | 14.5 | 253,000 | 3.0 |

TABLE 3

| Example | $[Peroxide]_i$ | $[GMA]_g$ % wt | $[Styrene]_g$ % wt | Graft eff. GMA % | Graft eff. Styrene % | $M_n$ g/mol | MWD |
|---|---|---|---|---|---|---|---|
| Comp. H | 0 | 0.06 | 0 | 1.0 | | 366,000 | 3.1 |
| 5 | 0.05 | 1.16 | 0.65 | 19.9 | 7.4 | 259,000 | 3.0 |
| 6 | 0.11 | 1.30 | 0.78 | 22.3 | 8.9 | 297,000 | 3.2 |
| 7 | 0.20 | 1.65 | 1.07 | 28.3 | 12.3 | 250,000 | 3.1 |
| 8 | 0.44 | 2.02 | 1.50 | 34.7 | 17.2 | 235,000 | 1.36 |

TABLE 4

| Example | $[Peroxide]_i$ % wt | $[GMA]_i$ % wt | $[Styrene]_i$ % wt | $[GMA]_g$ % wt | $[Styrene]_g$ % wt | Graft eff. GMA % | Graft eff. Styrene % |
|---|---|---|---|---|---|---|---|
| 9 | 0.30 | 1.40 | 1.96 | 0.52 | 0.39 | 37.1 | 19.9 |
| 10 | 0.30 | 3.00 | 4.20 | 0.92 | 0.69 | 30.7 | 16.4 |

We claim:

1. A method of free radical grafting of monomers onto a polypropylene resin comprising:
   (i) mixing the polypropylene resin having a melt flow index of 0.2 to 100g/10 minutes (230° C./2.16 kg) with an unsaturated epoxy compound having the formula

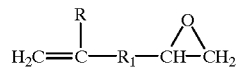

in which R is H or a $C_{1-4}$ alkyl; $R_1$ is $-(CH_2)_n-$; $C(O)O-(CH_2)_n-$; or $-(CH_2)_n-O-$; and n is an integer of 1 to 4;
   a styrenic compound having the formula:

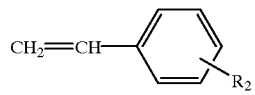

in which $R_2$ is H, OH, $CH_3$ or allyl; and
   a peroxide as an initiator,
   (ii) heating said mixture to a temperature which is higher than the melting point of the polypropylene resin and the decomposition temperature of said peroxide, at conditions of continuous mixing until a desired degree of grafting of the unsaturated epoxy compound and the styrenic compound onto the polypropylene resin has been achieved, and
   (iii) cooling and comminuting the obtained composition; wherein said unsaturated epoxy compound is used in an amount of from 5 to 10% by weight and said styrenic compound is used in an amount of from 2 to 10% by weight based on the weight of the polypropylene resin.

2. The method of claim 1, that the melting and mixing of the reagents is performed in an inert atmosphere.

3. The method of claim 1, wherein the grafting process is performed in a closed mixer at conditions of continuous agitation.

4. The method of claim 1, wherein the grafting process is performed in an extruder.

5. The method of claim 1, wherein the grafting is performed at conditions where the styrenic compound both acts as a chain transfer compound and as a copolymerizable monomer, whereby the β-scission of the polypropylene polymer is lower than what is obtainable with neat polypropylene resin being processed alone.

6. The method of claim 1, wherein the unsaturated epoxy compound is glycidyl methacrylate.

7. The method of claim 1, wherein the styrenic compound is styrene.

8. A grafted polypropylene composition produced by the method of claim 1.

9. The method according to claim 2, wherein the grafting process is performed in an extruder.

10. The method of claim 4, wherein the grafting is performed at conditions where the styrenic compound both acts as a chain transfer compound and as a copolymerizable monomer, whereby the β-scission of the polypropylene polymer is lower than what is obtainable with neat polypropylene resin being processed alone.

11. The method of claim 5, wherein the unsaturated epoxy compound is glycidyl methacrylate.

12. The method of claim 6, wherein the styrenic compound is styrene.

13. A grafted polypropylene composition produced by the method of claim 7.

14. A method of free radical grafting of monomers onto a polypropylene resin to promote polymer adhesion, comprising:
   (i) mixing the polypropylene resin having a melt flow index of 0.2 to 100 g/10 minutes (230° C./2.16 kg) with an unsaturated epoxy compound having the formula

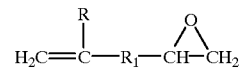

in which R is H or a $C_{1-4}$ alkyl; $R_1$ is $-(CH_2)_n-$; $C(O)O-(CH_2)_n-$; or $-(CH_2)_n-O-$; and n is an integer of 1 to 4, the unsaturated epoxy compound used in an amount of from 5 to 10% by weight of the polypropylene resin;
   a styrenic compound having the formula:

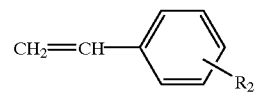

in which $R_2$ is H, OH, $CH_3$ or allyl, the styrenic compound used in an amount of from 2 to 10% by weight based on the weight of the polypropylene resin; and a peroxide as an initiator,
   (ii) heating said mixture to a temperature which is higher than the melting point of the polypropylene resin and the decomposition temperature of said peroxide, at conditions of continuous mixing until a desired degree of grafting of the unsaturated epoxy compound and the styrenic compound onto the polypropylene resin has been achieved;
   (iii) cooling and comminuting the obtained composition; and
   (iv) promoting polymer adhesion using the obtained composition as a polymer adhesion promoter.

15. The method of claim 2, wherein the atmosphere is a nitrogen atmosphere.

* * * * *

UNITED STATES PATENT AND TRADEMARK OFFICE
CERTIFICATE OF CORRECTION

PATENT : 6,028,146
DATED : Feb. 22, 2000
INVENTOR(S) : Kotlar et al.

It is certified that error appears in the above-identified patent and that said Letters Patent is hereby corrected as shown below:

Column 3, line 9, delete "mast", and substitute therefor --must--;

Column 5, line 53, delete "withdraw n", and substitute therefor --withdrawn--;

Claim 2, line 1, delete "that", and substitute therefor --wherein--.

Signed and Sealed this

Fifteenth Day of May, 2001

Attest:

NICHOLAS P. GODICI

Attesting Officer

Acting Director of the United States Patent and Trademark Office